US012572564B2

(12) United States Patent
Yao et al.

(10) Patent No.: US 12,572,564 B2
(45) Date of Patent: Mar. 10, 2026

(54) TAXONOMY-BASED DIAGNOSTIC SYSTEM AND METHOD, AND READABLE STORAGE MEDIUM

(71) Applicants: Aktiebolaget SKF, Gothenburg (SE); SKF (China) Co Ltd, Shanghai (CN)

(72) Inventors: Shuo Yao, Shanghai (CN); Gang Cheng, Shanghai (CN); Jim Wei, Shanghai (CN)

(73) Assignees: Aktiebolaget SKF, Gothenburg (SE); SKF (China) Co Ltd, Shanghai (CN)

( * ) Notice: Subject to any disclaimer, the term of this patent is extended or adjusted under 35 U.S.C. 154(b) by 477 days.

(21) Appl. No.: 18/097,589

(22) Filed: Jan. 17, 2023

(65) Prior Publication Data

US 2023/0237073 A1      Jul. 27, 2023

(30) Foreign Application Priority Data

Jan. 21, 2022      (CN) .......................... 202210070263.4

(51) Int. Cl.
| | |
|---|---|
| *G06F 17/40* | (2006.01) |
| *G05B 23/00* | (2006.01) |
| *G06F 16/28* | (2019.01) |

(52) U.S. Cl.
CPC .................................. *G06F 16/285* (2019.01)

(58) Field of Classification Search
None
See application file for complete search history.

(56) References Cited

U.S. PATENT DOCUMENTS

| | | | | |
|---|---|---|---|---|
| 10,157,347 | B1 * | 12/2018 | Kasturi .................. | G06N 20/10 |
| 2010/0198841 | A1 * | 8/2010 | Parker ................... | G06F 16/951 |
| | | | | 707/750 |
| 2012/0290576 | A1 * | 11/2012 | Amorim ............... | G06F 16/258 |
| | | | | 707/E17.046 |
| 2014/0310222 | A1 * | 10/2014 | Davlos ................ | G06F 11/2294 |
| | | | | 706/46 |

FOREIGN PATENT DOCUMENTS

| | | | | | |
|---|---|---|---|---|---|
| CN | 112101596 | A | * 12/2020 | ............. | G06Q 10/20 |
| JP | 2016091378 | A | * 5/2016 | | |
| JP | 2017162417 | A | * 9/2017 | | |
| KR | 20180072207 | A | * 6/2018 | ............. | B43L 21/04 |

* cited by examiner

*Primary Examiner* — Christopher B Robinson
(74) *Attorney, Agent, or Firm* — THE GARCIA-ZAMOR LAW FIRM; Ruy Garcia-Zamor

(57)      ABSTRACT

The present disclosure provides a taxonomy-based diagnostic system and method, and a readable storage medium. The disclosure includes a classification gateway configured to store taxonomic information including classification definition data for identifying a predetermined device and corresponding diagnostic data includes diagnoses made on the predetermined device, features that need to be extracted for diagnosis, and monitoring data required to extract each feature; a database configured to store a plurality of diagnostic libraries corresponding to the taxonomic information including diagnostic models for determining a status of a device based on features of the device; an application unit configured to receive first classification definition data that identifies the target device; a data acquisition unit that acquires monitoring data of the target device; a processing unit that determines status of the target device according to monitoring data of the target device and diagnostic models in diagnostic libraries.

10 Claims, 9 Drawing Sheets

Processing unit 150

Feature extraction module
410

Matching module 420

Diagnosis module 430

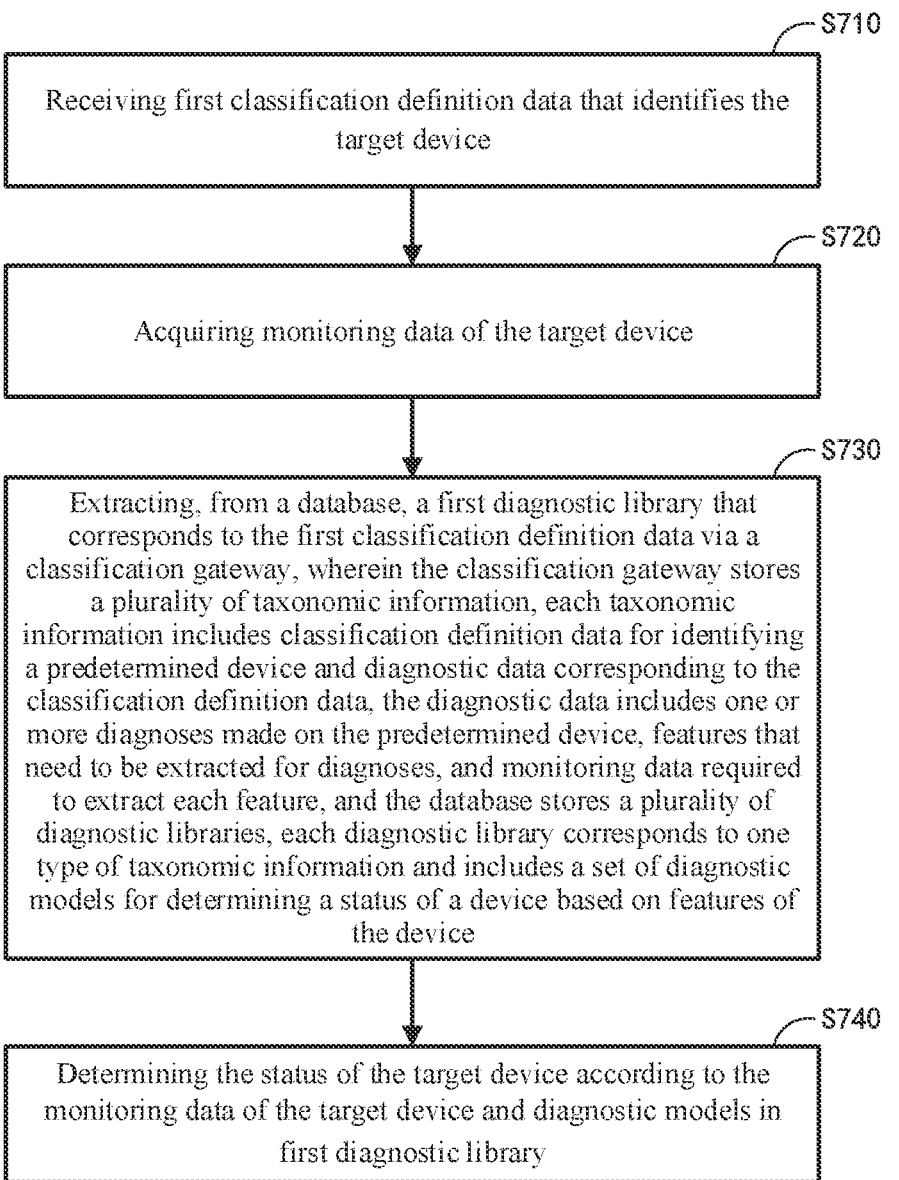

S710

Receiving first classification definition data that identifies the target device

S720

Acquiring monitoring data of the target device

S730

Extracting, from a database, a first diagnostic library that corresponds to the first classification definition data via a classification gateway, wherein the classification gateway stores a plurality of taxonomic information, each taxonomic information includes classification definition data for identifying a predetermined device and diagnostic data corresponding to the classification definition data, the diagnostic data includes one or more diagnoses made on the predetermined device, features that need to be extracted for diagnoses, and monitoring data required to extract each feature, and the database stores a plurality of diagnostic libraries, each diagnostic library corresponds to one type of taxonomic information and includes a set of diagnostic models for determining a status of a device based on features of the device

S740

Determining the status of the target device according to the monitoring data of the target device and diagnostic models in first diagnostic library

Figure 7

TAXONOMY-BASED DIAGNOSTIC SYSTEM AND METHOD, AND READABLE STORAGE MEDIUM

TECHNICAL FIELD

The present disclosure relates to the field of data processing, and more particularly, to a taxonomy-based diagnostic system and method, and a readable storage medium.

BACKGROUND

At present, in order to ensure a device's normal operation, it is usually necessary to diagnose the device to determine its status, so as to facilitate carrying out operations such as management and maintenance on the device.

However, usually, there are for example a lot of devices in factories. These devices may have different characteristics (physical characteristics, electrical characteristics, etc.) and they may be in different environments. Therefore, in order to determine the statuses of different devices, the diagnostic systems in the prior art often use rule-based fault diagnosis, users are required to develop, customize diagnosis rule models for each device to be diagnosed in each operating status and each application situation before performing each diagnosis in order to ensure accuracy of the diagnosis. However, it will take a lot of time to develop, manage and apply these models, and developing, managing and applying these models can't be implemented automatically.

Therefore, an efficient diagnostic system that can be executed automatically while ensuring customized diagnosis to be performed on devices is expected.

SUMMARY

In view of the above problems, the present disclosure provides a taxonomy-based diagnostic system and method, and a readable storage medium, which can efficiently and automatically determine a status of a target device while ensuring customized diagnosis to be performed on devices.

According to an aspect of the present disclosure, there is provided a taxonomy-based diagnostic system for determining a status of a target device, comprising: a classification gateway configured to store a plurality of taxonomic information, each taxonomic information including classification definition data for identifying a predetermined device and diagnostic data corresponding to the classification definition data, wherein the diagnostic data includes one or more diagnoses made on the predetermined device, features that need to be extracted for diagnosis, and monitoring data required to extract each feature; a database configured to store a plurality of diagnostic libraries, each diagnostic library corresponding to one type of taxonomic information and including a set of diagnostic models for determining a status of a device based on features of the device; an application unit configured to receive first classification definition data that identifies the target device; a data acquisition unit configured to acquire monitoring data of the target device; and a processing unit configured to determine the status of the target device according to the monitoring data of the target device and diagnostic models in diagnostic libraries corresponding to the first classification definition data acquired from the database through the classification gateway.

According to some embodiments of the present disclosure, wherein the classification gateway is further configured to: parse the first classification definition data received by the application unit, and determine, from the stored plurality of taxonomic information, first taxonomic information that corresponds to the first classification definition data; determine, from the first taxonomic information, a list of features that need to be extracted and titles of monitoring data required to extract each feature, and output them to the processing unit; and extract, from the database, a first diagnostic library that corresponds to the first taxonomic information, and output the first diagnostic library to the processing unit.

According to some embodiments of the present disclosure, wherein the processing unit further comprises: a feature extraction module configured to read the monitoring data of the target device acquired by the data acquisition unit, and extract, from the monitoring data, feature values of one or more features according to the list of features that need to be extracted and the titles of the monitoring data required to extract each feature as received from the classification gateway; a matching module configured to determine whether the extracted one or more features match a list of features required for diagnosis of one or more diagnostic models in the first diagnostic library, and activate a set of corresponding diagnostic models in response to that the extracted one or more features match a list of features required for diagnosis, wherein the diagnostic models are based on predetermined diagnostic rules and have a predetermined list of features required for diagnosis; a diagnosis module configured to perform diagnosis, for the activated set of diagnostic models, according to predetermined diagnosis rules in the diagnostic models by using the extracted feature values of one or more features, to output a diagnosis result indicative of the status of the target device.

According to some embodiments of the present disclosure, wherein the feature extraction module is further configured to: determine whether the monitoring data of the target device conforms to the monitoring data required to extract each feature as indicated in the diagnostic data in the first taxonomic information; extract feature values of the one or more features from the monitoring data of the target device in response to that the monitoring data of the target device conforms to the monitoring data required to extract the one or more features; and skip extraction of a specific feature in response to that the monitoring data of the target device does not conform to the monitoring data required to extract the specific feature.

According to some embodiments of the present disclosure, wherein the application unit is further configured to receive second classification definition data that identifies the second device, wherein the processing unit further includes a diagnostic library management module, the classification gateway is further configured to: parse the second classification definition data that identifies a second device as received by the application unit; determine whether there is a second diagnostic library corresponding to the second classification definition data in the database; extract the second diagnostic library from the database and output the second diagnostic library to the diagnostic library management module in response to the existence of a second diagnostic library that corresponds to the second classification definition data in the database, the diagnostic library management module is configured to: adjust, based on user instructions, one or more diagnostic models in the second diagnostic library, the adjustment including editing, deleting and/or creating diagnostic models for the second diagnostic library; and store the adjusted second diagnostic library in the database via the classification gateway.

According to some embodiments of the present disclosure, wherein the classification gateway is further configured to: initialize a third diagnostic library that has a universal format and output the third diagnostic library to the diagnostic library management module in response to the absence of a second diagnostic library that corresponds to the second classification definition data in the database; the diagnostic library management module is configured to: adjust, based on user instructions, one or more diagnostic models in the third diagnostic library, the adjustment including editing, deleting and/or creating diagnostic models for the third diagnostic library; store the adjusted third diagnostic library in the database via the classification gateway, the third diagnostic library corresponding to the second classification definition data.

According to some embodiments of the present disclosure, wherein the classification definition data includes a plurality of definition parameters related to a predetermined device, each of the definition parameters indicates a different characteristic of the predetermined device respectively.

According to some embodiments of the present disclosure, wherein the definition parameters include one or more of an asset title, an asset sequence, an asset category, an asset type, and a segment.

According to another aspect of the present disclosure, there is further provided a taxonomy-based diagnostic method for determining a status of a target device, comprising: receiving first classification definition data that identifies the target device; acquiring monitoring data of the target device; and extracting, from a database, a first diagnostic library that corresponds to the first classification definition data via a classification gateway, wherein the classification gateway stores a plurality of taxonomic information, each taxonomic information includes classification definition data for identifying a predetermined device and diagnostic data corresponding to the classification definition data, the diagnostic data includes one or more diagnoses made on the predetermined device, features that need to be extracted for diagnosis, and monitoring data required to extract each feature, each diagnostic library corresponds to one type of taxonomic information and includes a set of diagnostic models for determining a status of a device based on features of the device; and determining the status of the target device according to the monitoring data of the target device and diagnostic models in first diagnostic library.

According to another aspect of the present disclosure, there is further provided a non-transitory computer-readable storage medium that stores computer-readable instructions, wherein a taxonomy-based diagnostic system for determining a status of a target device according to any aspect in the above is implemented when the computer-readable instructions are executed by a processor.

Therefore, in the diagnostic system according to the embodiments of the present disclosure, for a plurality of predetermined devices, a plurality of taxonomic definitions are stored in the classification gateway of the system, and a plurality of diagnostic libraries corresponding to each taxonomic definition are stored in the database of the system, wherein each taxonomic information includes taxonomic definition data for identifying the predetermined devices and diagnostic data corresponding to the taxonomic definition data. In this way, when one target device among the plurality of predetermined devices is diagnosed, the diagnostic model customized for the target device in the diagnostic library corresponding to the first classification definition data can be obtained quickly and easily from the database through the classification gateway under the condition of only the first classification definition data of the target device is received, and the diagnosis can be performed automatically in combination with the monitoring data of the target device, so as to efficiently determine the status of the target device while performing the customized diagnosis.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. In order to more clearly explain the technical solutions of the embodiments of the present disclosure, the drawings needed in the description of the embodiments will be briefly introduced below. Obviously, the drawings in the following description are only some exemplary embodiments of the present disclosure. For those of ordinary skill in the art, other drawings may be obtained according to these drawings without any creative effort.

FIG. 7 shows a flowchart of a diagnostic method according to a third embodiment of the present disclosure.

DETAILED DESCRIPTION OF THE EMBODIMENTS

Figure 1:
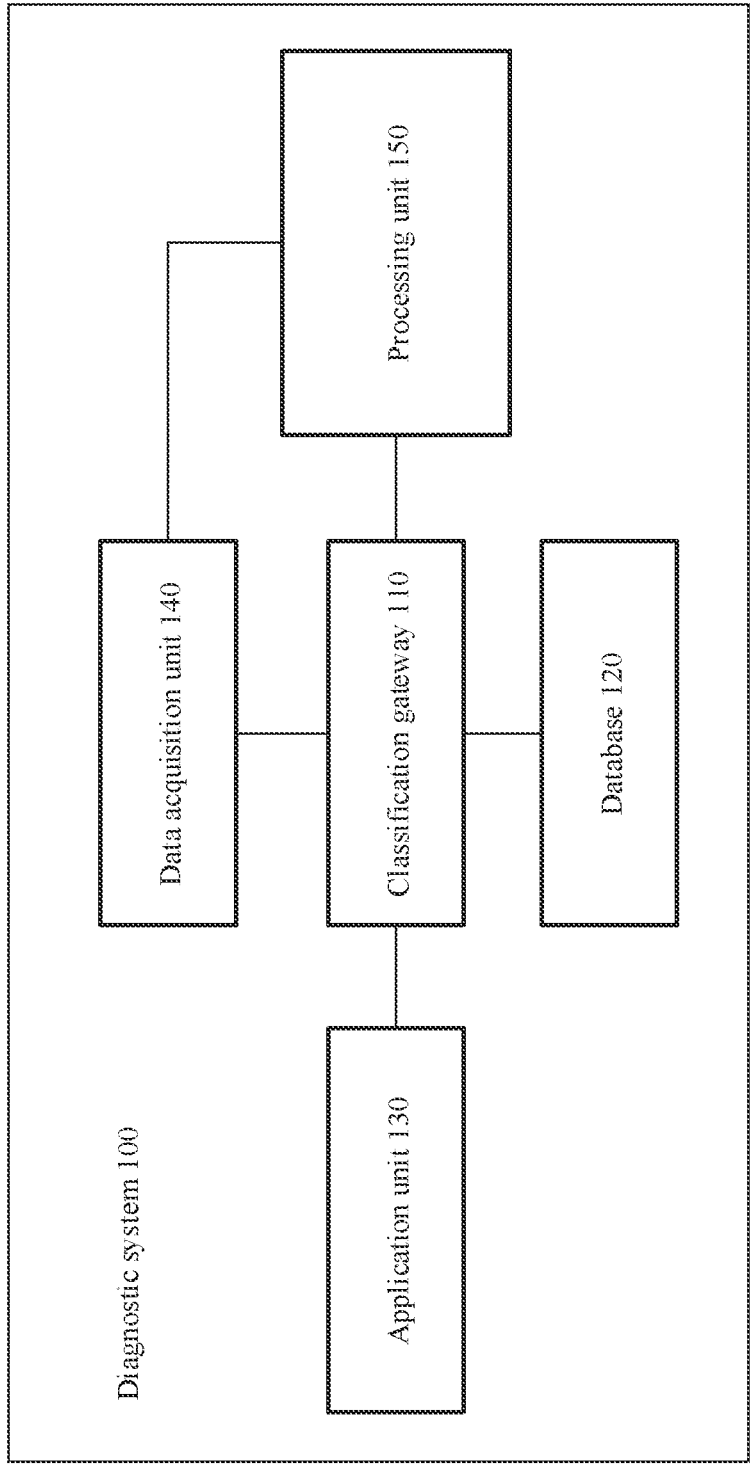
FIG. 1 shows a block diagram of a taxonomy-based diagnostic system for determining a status of a target device according to a first embodiment of the present disclosure.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five)(45° degrees, fifty-two (52°) degrees, or the like and thus provides support for claiming a preferred embodiment with the element moving along the arcuate path thirty-three-point five (33.5°) degrees. In order to make the objectives, technical solutions and advantages of the present disclosure more apparent, the exemplary embodiments according to the present disclosure will be described in a clear and complete way below with reference to the drawings. Obviously, the described embodiments are only part of the embodiments of the present disclosure, rather than all the embodiments of the present disclosure, all the other embodiments obtained by those of ordinary skill in the art based on the embodiments of the present disclosure without paying creative efforts fall into the protection scope of the present disclosure.

Unless otherwise defined, technical terms or scientific terms used in the present disclosure shall have common meaning known by those skilled in the art to which the present disclosure pertains. Words and expressions such as "first", "second" and the like used in the present disclosure do not denote any sequence, quantity or priority, but only intend to distinguish different components. Words such as "include", "contain" and the like refer to that an element or an object before this word contains all the elements or objects listed thereinafter or alternatives thereof, without excluding other elements or objects. Words such as "connected", "connecting" and the like are not restricted to physical or mechanical connections, but may include electrical connections, regardless of direct or indirect connections. Words such as "up", "below", "left", "right", etc., are only used to denote relative positional relationship, once an absolute position of the described object changes, the relative positional relationship may probably change correspondingly. In order to keep the following description of the embodiments of the present disclosure clear and concise, the detailed description of some known functions and known components is omitted in the present disclosure.

The flow chart is used in the present disclosure to illustrate steps of the method according to the embodiments of the present disclosure. It should be understood that the preceding or subsequent steps may not be necessarily performed precisely in order. Instead, the respective steps may be processed in a reverse order or simultaneously. At the same time, other operations may be added to these processes, or one or several steps may be removed from these processes.

In the specification and drawings of the present disclosure, elements are described in singular or plural forms according to the embodiments. However, the singular and plural forms are appropriately selected for the proposed situations only for convenience of explanation, not intended to limit the present disclosure. Therefore, singular forms may include plural forms, and plural forms may also include singular forms, unless the context clearly indicates otherwise.

First Embodiment

FIG. 1 shows a block diagram of a taxonomy-based diagnostic system 100 for determining a status of a target device according to the first embodiment of the present disclosure. As shown in FIG. 1, the diagnostic system 100 may include a classification gateway 110, a database 120, an application unit 130, a data acquisition unit 140, and a processing unit 150, wherein:

The classification gateway 110 is configured to store a plurality of taxonomic information, each taxonomic information includes classification definition data for identifying a predetermined device and diagnostic data corresponding to the classification definition data, wherein the diagnostic data includes one or more diagnoses made on the predetermined device, features that need to be extracted for diagnosis, and monitoring data required to extract each feature;

The database 120 is configured to store a plurality of diagnostic libraries, each diagnostic library corresponds to one type of taxonomic information and includes a set of diagnostic models for determining a status of a device based on features of the device;

The application unit 130 is configured to receive first classification definition data that identifies the target device;

The data acquisition unit 140 is configured to acquire monitoring data of the target device; and The processing unit 150 is configured to determine the status of the target device according to the monitoring data of the target device and diagnostic models in diagnostic libraries corresponding to the first classification definition data acquired from the database through the classification gateway.

Respective units in the above diagnostic system will be described in further detail below.

Specifically, according to the first embodiment of the present disclosure, the classification gateway 110 may be configured to store a plurality of taxonomic information, each taxonomic information includes classification definition data for identifying a predetermined device and diagnostic data corresponding to the classification definition data, wherein the diagnostic data includes one or more diagnoses made on the predetermined device, features that need to be extracted for diagnosis, and monitoring data required to extract each feature.

Figure 2A:
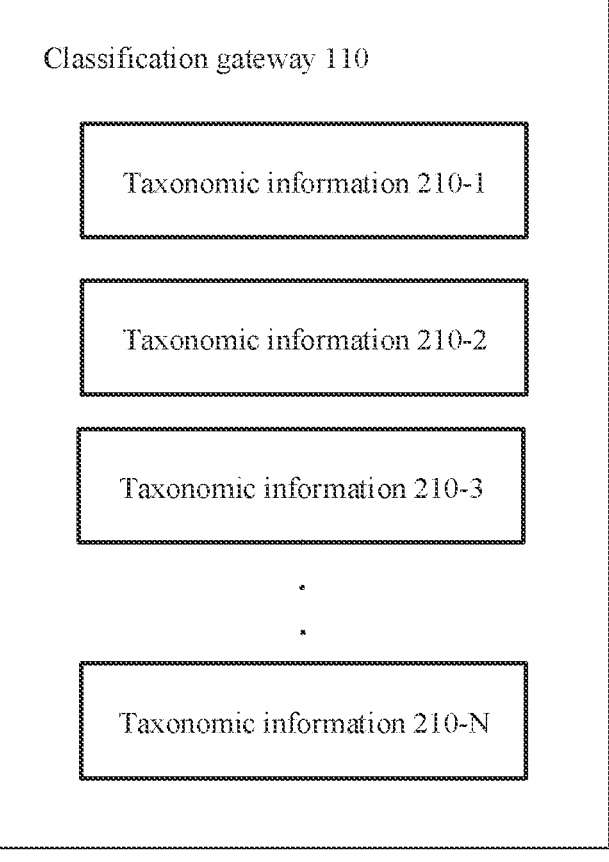
FIG. 2A shows a schematic diagram of a classification gateway according to the first embodiment of the present disclosure.

FIG. 2A shows a schematic diagram of a classification gateway according to the first embodiment of the present disclosure. As shown in FIG. 2, the classification gateway 110 stores a plurality of taxonomic information 210 (210-1 . . . 210-N). For convenience of explanation in the following, the taxonomic information 210 may be used to represent the taxonomic information 210-1 . . . 210-N. Each taxonomic information 210 includes classification definition data 220 for identifying different predetermined devices. Generally, the number of classification definition data 220 may reach more than 10,000, so as to achieve different classification definition data 220 corresponding to different predetermined devices in the actual scenario.

In one example, the predetermined device may be any one of a device, an apparatus, an instrument, a machine, and a component included by them. For example, the predetermined device may be a motor or a bearing or rotor in the motor, or a cable, a connector, etc. These predetermined devices may be used in metallurgical industry, energy industry, railway industry, etc.

According to the first embodiment of the present disclosure, in order to distinguish different predetermined devices, the classification definition data 220 may include a plurality of definition parameters related to the predetermined devices, each of these definition parameters indicates different characteristics of the predetermined devices, respectively. The definition parameters may also be other parameters used to indicate that a predetermined device is different from other devices.

Figure 2B:
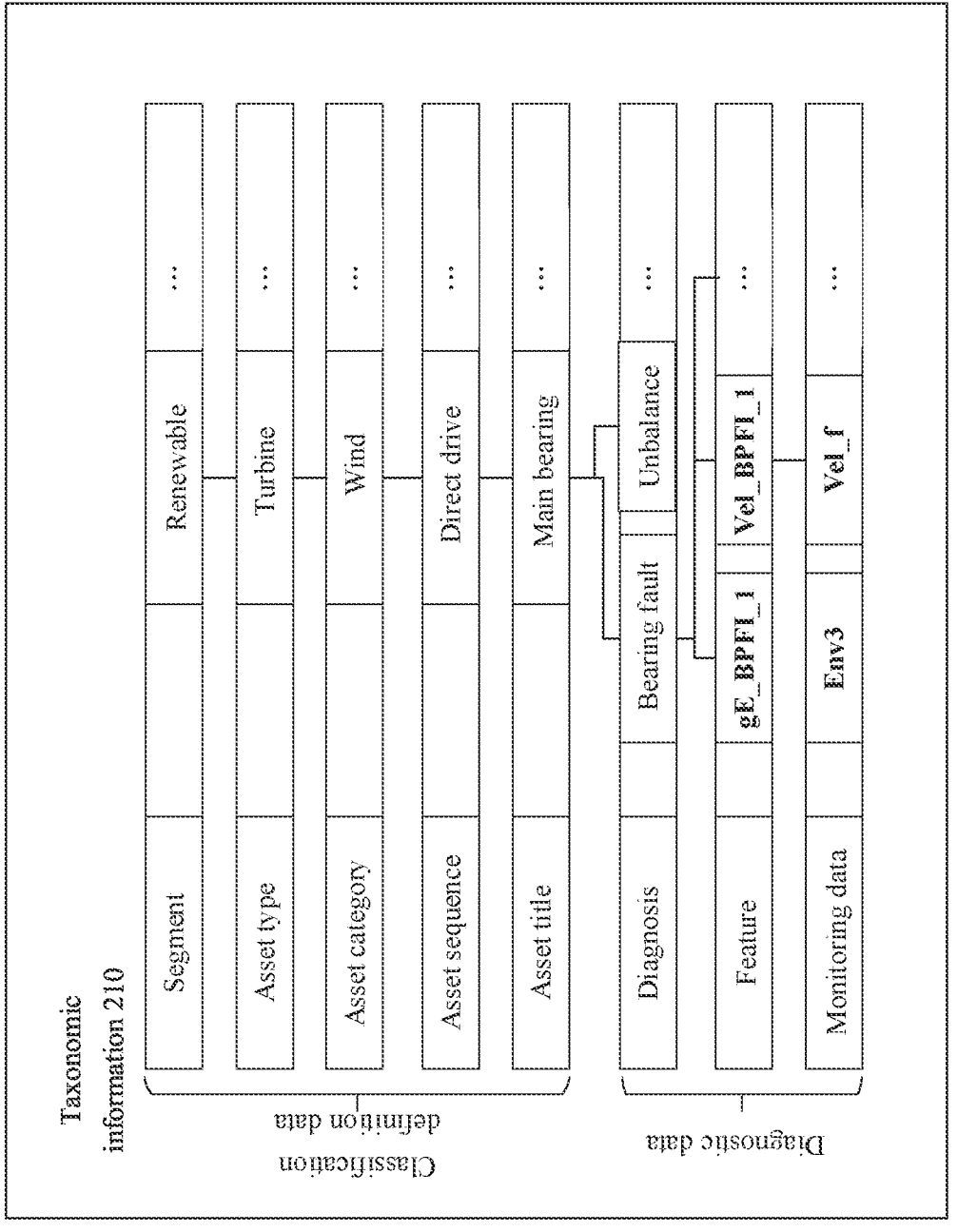
FIG. 2B is a schematic diagram of one of a plurality of taxonomic definitions shown in FIG. 2A.

According to the first embodiment of the present disclosure, the definition parameters may include one or more of an asset title, an asset sequence, an asset category, an asset type, and a segment. FIG. 2B is a schematic diagram of one of a plurality of taxonomic definitions shown in FIG. 2A. In the example of FIG. 2B, the definition parameters in the classification definition data 220 include the asset title (main bearing), the asset sequence (direct drive), the asset category (wind), the asset type (turbine) and the segment (renewable) of devices. Therefore, different predetermined devices may be identified by using the classification definition data 220 with different definition parameters, so that the diagnostic system can identify the device to be diagnosed according to the classification definition data.

In addition, according to the first embodiment of the present disclosure, each taxonomic information 210 may further include diagnostic data 230 corresponding to the classification definition data, wherein the diagnostic data 230 includes one or more diagnoses made on the predetermined device, features that need to be extracted for diagnosis, and monitoring data required to extract each feature.

In one example, diagnosis may refer to diagnosing the failure of a device or the status of a device for further analysis. In the example shown in FIG. 2B, for the aforementioned classification definition data 220, the corresponding diagnostic data 230 may include bearing fault diagnosis, unbalance, etc. The features to be extracted for bearing fault diagnosis include gE_BPFI_1, Vel_BPFI_1, etc., the monitoring data required for extracting gE_BPFI_1 includes Env3, and the monitoring data required for extracting Vel_BPFI_1 includes VEL_F.

It should be noted that the example shown in FIG. 2B is only for illustration, and one or more same diagnoses may be performed for different predetermined devices. For example, the same first diagnosis may be performed for a first predetermined device and a second predetermined device. In addition, for different diagnoses, part of features that need to be extracted may be the same. For example, the first feature and the second feature need to be extracted for the first diagnosis, the first feature and the third feature need to be extracted for the second diagnosis. Similarly, for different features, part of the monitoring data required for feature extraction may be the same. For example, the monitoring data required for extracting the first feature includes the first monitoring data and the second monitoring data, and the monitoring data required for extracting the second feature includes the first monitoring data and the third monitoring data.

In one example, the features to be extracted for diagnosis and the monitoring data required for extracting each feature included in the diagnostic data 230 refer to the titles or types of features and monitoring data, rather than feature values of features and values of monitoring data.

In addition, in one example, in order to make the diagnostic system 100 applicable to different scenarios, the taxonomic information 210 and the classification definition data 220 and diagnosis data 230 included therein may also be modified and/or expanded according to different needs. However, in some cases, the taxonomic information 210 and the classification definition data 220 and diagnosis data 230 included therein may be appropriately reduced when there are fewer devices to be diagnosed, thus storage space of the system is saved.

According to the first embodiment of the present disclosure, the diagnostic system 100 may further include a database 120, the database is configured to store a plurality of diagnostic libraries, each diagnostic library corresponds to one type of taxonomic information 210 and includes a set of diagnostic models for determining a status of a device based on features of the device.

Figure 3:
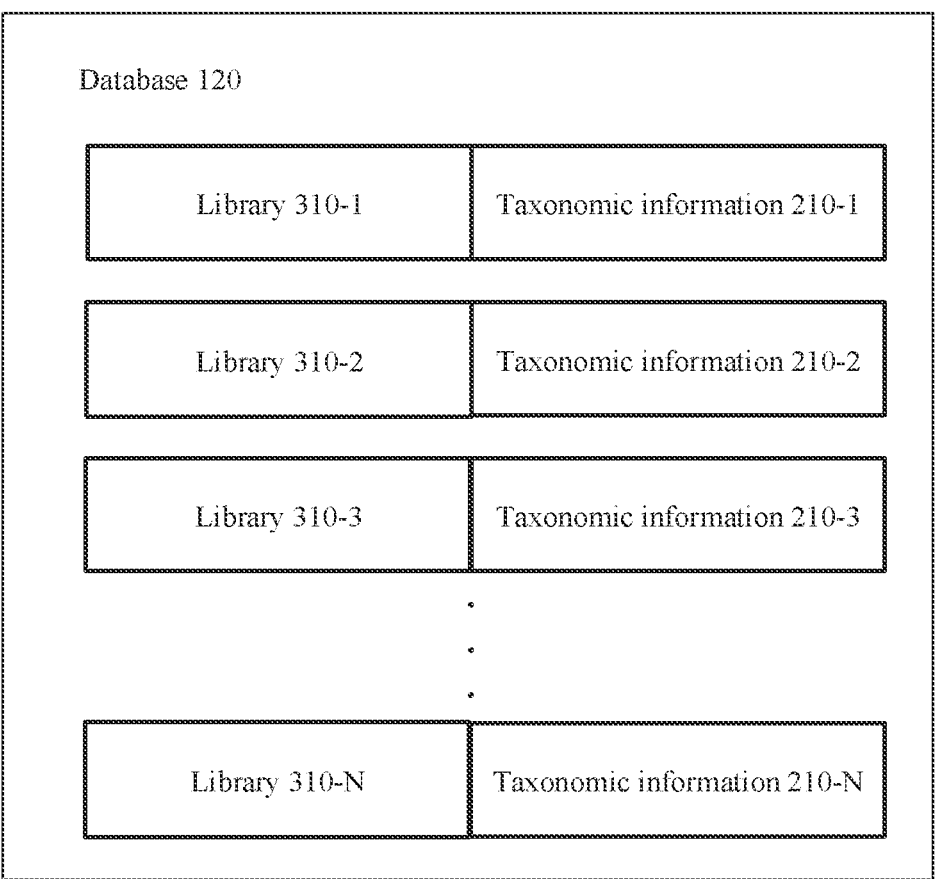
FIG. 3 shows a schematic diagram of a database according to the first embodiment of the present disclosure.

FIG. 3 shows a schematic diagram of the database 120 according to the first embodiment of the present disclosure. As shown in FIG. 3, the database 120 includes a plurality of diagnostic libraries (310-1 . . . 310-N), and the taxonomic information corresponding to each diagnostic library is different. For example, the diagnostic library 310-1 corresponds to the taxonomic information 210-1, the diagnostic library 310-2 corresponds to the taxonomic information 210-2, and so on, and so forth. It should be noted that the above correspondence is only for illustration, the correspondence between the diagnostic library and the taxonomic information is not limited to a sequential relationship.

In one example, the correspondence between the diagnostic library 310 and the taxonomic information 210 may be realized by corresponding to the classification definition data 220 in the taxonomic information 210. For example, the corresponding diagnostic library 310 may be determined according to the definition parameters included in the classification definition data 220.

In one example, the correspondence between the diagnostic library 310 and the taxonomic information 210 may be realized by mean of using the taxonomic information 210 or the classification definition data 220 included therein as the index of the diagnostic library 310, or by mean of using the taxonomic information 210 or the classification definition data 220 included therein as the title of the diagnostic library 310.

In one example, a set of diagnostic models included in the diagnostic library 310 may be one or more diagnostic models. These diagnostic models are customized diagnostic models for the predetermined devices to which they correspond, so accuracy of the diagnosis performed can be ensured when using such diagnostic models. In addition, it is necessary to customize the diagnostic model by editing a universal template before each diagnosis in the prior art, editing the universal template is usually difficult for users, so it is difficult to customize the accurate diagnostic model for the target device to be diagnosed. This problem can be avoided by setting a diagnostic library with a diagnostic model for a predetermined device in advance.

Usually, the diagnostic model takes features of a device as input, and determines a status of the device according to the preset diagnostic model rules. In one example, the diagnostic model may be a rule-based model, for example, it may be a decision tree model. In each layer of the decision tree model, a determination can be made according to features of the device, so as to finally output the diagnosis result (that is, the status of the device). In one example, the diagnostic model may also be a neural network model that has been trained based on a training set, where the training set includes features of the device.

In addition, the diagnostic system 110 may be a heavyweight or lightweight application according to the needs of users.

For example, in the aforementioned example of modifying and/or expanding the taxonomic information 210 and the classification definition data 220 and diagnosis data 230 included therein, the diagnostic library and the diagnostic models included in the diagnostic library 310 may also be modified and/or expanded according to different needs, so that the diagnostic system 100 are made to be applied to different scenarios. In this case, the diagnostic system may include various types of diagnostic libraries required for different scenarios to realize the heavyweight application of the system.

As mentioned above again, in the case of fewer devices requiring diagnosis, corresponding to the reduction of taxonomic information 210 and the classification definition data 220 and diagnosis data 230 included therein, the corresponding diagnostic library 310 in the database may also be reduced, thus storage space of the system is saved.

In one example, the database 120 may not be stored inside the diagnostic system 100, but stored in a memory external to the diagnostic system 100, and the diagnostic system may access the database 120 via a network. In this way, the diagnostic system 100 can be further lightened, and can be implemented in portable processing devices (e.g., smart phones, tablet computers, laptop computers, etc.). The lightweight application of the system can be realized by reducing storage space of the system.

In one example, the network may be a wired network and/or a wireless network. For example, the wired network may adopt twisted pair, coaxial cable or optical fiber transmission and other manners for data transmission, while the wireless network may adopt mobile communication network such as 3G/4G/5G, Bluetooth, Zigbee or WiFi and other manners for data transmission.

By setting the classification gateway 110 with the taxonomic information 210 and the database 120 with the diagnostic library 310 containing the pre-customized diagnostic models in the diagnostic system, the diagnostic system 100 are made to quickly and easily and automatically determine the diagnostic models to perform diagnosis for the target device to be diagnosed based on the taxonomic information while ensuring customization, thus efficiently determining the status of the target device. The process of diagnosis by the diagnostic system 100 will be described in further detail below.

According to the first embodiment of the present disclosure, the diagnostic system 100 may further include an application unit 130, the application unit 130 may be configured to receive the first classification definition data that identifies the target device.

In an example, after receiving the first classification definition data that identifies the target device, the application unit 130 may transmit the first classification definition data to the classification gateway 110 for subsequent processing.

In one example, the application unit 130 may include an input/output (I/O) interface, the input/output (I/O) may be externally connected with various types of input/output devices to receive the first classification definition data inputted by the users and display the inputted content to the users.

According to the first embodiment of the present disclosure, the diagnostic system 100 further includes a data acquisition unit 140, which may be configured to acquire monitoring data of a target device.

In one example, after the application unit 130 transmits the first classification definition data to the classification gateway 110, the data acquisition unit 140 is designated by the classification gateway to acquire the monitoring data of the target device. Alternatively, the data acquisition unit 140 may also acquire the monitoring information of a plurality of devices, but the data acquisition unit 140 only outputs the monitoring information of the target device to the processing unit 150 for subsequent processing according to the target device specified by the classification gateway. Alternatively, the data acquisition unit 140 may also acquire the monitoring information of a plurality of devices and transmit all the detected information to the processing unit 150 for subsequent processing. The configuration manner of the application unit 130 depends on the actual architecture of the diagnostic system 100.

For example, the data acquisition unit 130 may include a sensor, a collector and a data transmission module, wherein the sensor is used to measure data of the target device; the collector is used for acquiring the measured data; and the data transmission module outputs the acquired data to the processing unit 150.

In one example, the target device itself may be provided with a sensor to measure the monitoring data of the target device. For example, the sensor may measure monitoring data such as temperature, pressure and humidity. Additionally or alternatively, the sensor may also be a sensor on a periphery of the target device, for example, the sensor may be a sensor located on the ground around the target device to measure monitoring data such as vibration of the target device.

In one example, the monitoring data may include real-time data for determining the real-time status of devices. For example, the monitoring data may be real-time status data (CoMo Data). Additionally or alternatively, the monitoring data may also include non-real-time data, such as some data requiring continuous measurement.

According to the first embodiment of the present disclosure, the diagnostic system 100 may further include a processing unit 150, which may be configured to determine the status of the target device according to the monitoring data of the target device and the diagnostic model in the diagnostic library corresponding to the first classification definition data as acquired from the database through the classification gateway.

In one example, as mentioned above, the diagnostic library may include a set of diagnostic models, this set of diagnostic models may include one or more diagnostic models. That is, the diagnostic model corresponding to the first classification definition data can be one or more diagnostic models, so in one diagnosis, various statuses of the target device can be determined according to multiple diagnostic models applied in the diagnostic library.

Specifically, according to the first embodiment of the present disclosure, before the processing unit determines the status of the target device, the classification gateway 110 may be further configured to parse the first classification definition data received by the application unit 130, and determine, from the stored plurality of taxonomic information 210, first taxonomic information that corresponds to the first classification definition data; determine, from the first taxonomic information, a list of features that need to be extracted and titles of monitoring data required to extract each feature, and output them to the processing unit 150; and extract, from the database 130, a first diagnostic library that corresponds to the first taxonomic information, and output the first diagnostic library to the processing unit 150.

Figure 4:
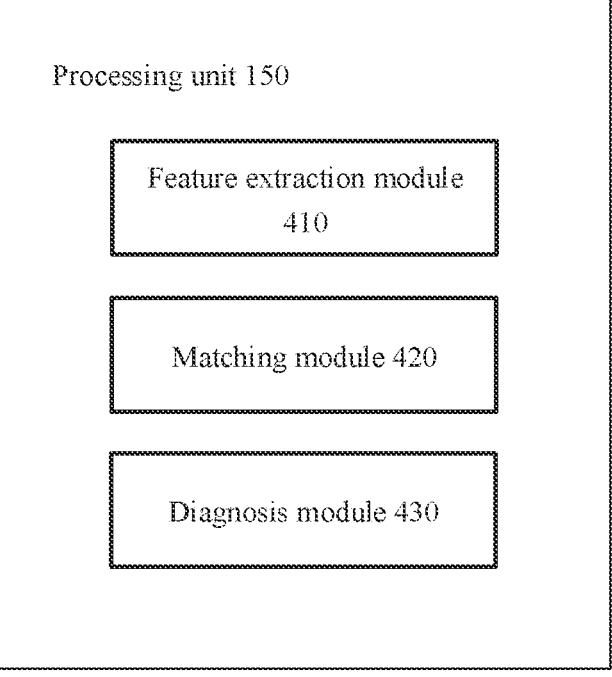
FIG. 4 shows a block diagram of a processing unit according to the first embodiment of the present disclosure.

Further, as shown in FIG. 4, according to the first embodiment of the present disclosure, the processing unit 150 may further include a feature extraction module 410, a matching module 420 and a diagnosis module 430.

The feature extraction module 410 may be configured to read the monitoring data of the target device acquired by the data acquisition unit 140, and extract, from the monitoring data, feature values of one or more features according to the list of features that need to be extracted and the titles of the monitoring data required to extract each feature as received from the classification gateway 110.

In one example, titles of features may be standardized by defining feature extraction rules in advance (e.g., establishing a developed feature extraction library), so that features can be extracted from the monitoring data more quickly. The way of feature extraction based on predefined feature extraction rules can help the diagnostic system 100 to be quickly applied to various scenarios, which is also helpful to further improve the model. In one example, the predefined feature extraction rules may be offline fixed rules stored in the diagnostic system or dynamic rules that can be adjusted via a network.

The matching module 420 may be configured to determine whether the extracted one or more features match a list of features required for diagnoses of one or more diagnostic models in the first diagnostic library, and activate a set of corresponding diagnostic models in response to that the extracted one or more features match a list of features required for diagnoses, wherein the diagnostic models are based on predetermined diagnostic rules and have a predetermined list of features required for diagnoses.

The diagnosis module 430 may be configured to perform diagnosis according to a predetermined diagnosis rule in the diagnostic model by using the extracted feature values of one or more features for the set of activated diagnostic models to output a diagnosis result indicating the status of the target device.

In one example, in the diagnosis module 430, feature values of one or more features may be fed into a rule engine, and the rule engine performs rule engine deduction according to the predetermined diagnosis rules in the diagnostic model, so as to obtain the diagnosis result.

According to the first embodiment of the present disclosure, the feature extraction module 410 may be further configured to determine whether the monitoring data of the target device conforms to the monitoring data required to extract each feature as indicated in the diagnostic data in the first taxonomic information; extract feature values of the one or more features from the monitoring data of the target device in response to that the monitoring data of the target device conforms to the monitoring data required to extract the one or more features; and skip extraction of a specific feature in response to that the monitoring data of the target device does not conform to the monitoring data required to extract the specific feature. Efficiency of the diagnostic system can be further improved by avoiding extracting unnecessary features.

Next, the first embodiment of the present disclosure will be further explained with reference to a specific example of diagnosis by the diagnostic system shown in FIG. 5.

Figure 5:
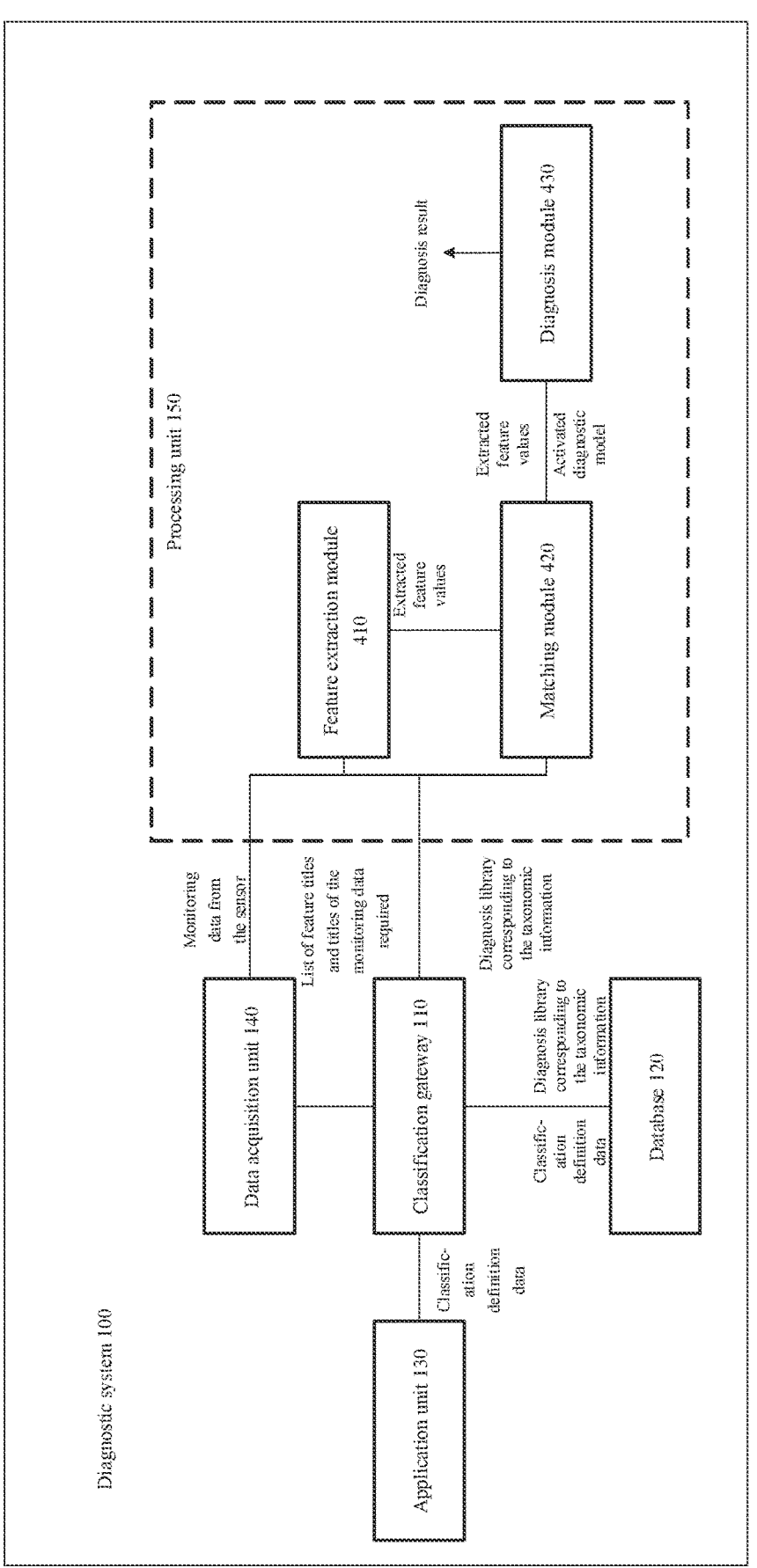
FIG. 5 shows a schematic diagram when the diagnostic system is being used for diagnosis according to the first embodiment of the present disclosure.

As shown in FIG. 5, when a user wants to determine the status of the main bearing of the wind turbine, the user may input classification definition data "Regeneration-Turbine-Wind-Direct Drive-Main Bearing" identifying the main bearing of the wind turbine into the diagnostic system 110. The application unit 130 receives the classification definition data "Regeneration-Turbine-Wind-Direct Drive-Main Bearing" and outputs it to the classification gateway.

Then, on the one hand, the classification gateway 110 determines the taxonomic information corresponding to the classification definition data "Regeneration-Turbine-Wind-Direct Drive-Main Bearing" from a plurality of taxonomic information stored by it according to the received classification definition data "Regeneration-Turbine-Wind-Direct Drive-Main Bearing", and extracts the list of features to be extracted and the titles of monitoring data required to extract each feature from the taxonomic definition: {feature1: VA, feature2: VA, feature3: VE, feature4: DD}, wherein feature1 and feature2 are the titles of features that can be extracted for the main bearing of the wind turbine, and VA, VE and DD are the titles of the monitoring data required to extract corresponding features, respectively. Thereafter, the classification gateway 110 outputs them to the feature extraction module 410 in the processing unit 150.

In addition, the classification gateway 110 also extracts the diagnostic library corresponding to the taxonomic information of the main bearing of the wind turbine from the database 120, and outputs it to the matching module 420 in the processing unit 150. In this example, the diagnostic library has the title of "Regeneration-Turbine-Wind-Direct Drive-Main Bearing", and the classification gateway can identify the diagnostic library according to the title for extraction.

On the other hand, the data acquisition unit 140 acquires the monitoring data VA and VE of the wind power main bearing according to the sensors installed on the wind power main bearing. The data acquisition unit 140 outputs the data to the feature extraction module 410 after acquiring the data.

Thereafter, the feature extraction module 410 may read the data VA and VE acquired by the data acquisition unit 140, and perform feature extraction from the monitoring data based on {Feature1: VA, Feature2: VA, Feature3: VE, Feature4: DD} from the classification gateway 110. Because the monitoring data type required for feature4 is DD, and the data acquired by the data acquisition unit 140 does not contain data of DD type, that is to say, the monitoring data does not conform to the monitoring data required for extracting feature4 indicated in the taxonomic information. Therefore, in this case, feature extraction of feature4 is skipped, and only feature1, feature2 and feature3 are extracted. The extraction result is {feature1: 0.642, feature2: 15.358, feature3: 4.112}.

After feature extraction is completed, the feature extraction module 410 may output feature values of the extracted features feature1, feature2 and feature3 to the matching module 420. The matching module 420 determines, according to the diagnostic library "Regeneration-Turbine-Wind-Direct Drive-Main Bearing" from the classification gateway 110, that the diagnostic library includes model A and model B, where the model A requires feature1, feature3 and the model B requires feature1, feature2, feature3 and feature4. Since the features extracted by the feature extraction module 410 only include feature1, feature2, and feature3, the extracted features only match the model A, do not match the model B. In this case, the matching module only activates the model A for subsequent processing. And the feature values {feature1: 0.642, feature2: 15.358, feature3: 4.112} extracted by the feature extraction module and the model A are outputted to the diagnosis module 430.

Next, the diagnosis module 430 uses the extracted feature values {Feature1: 0.642, Feature2: 15.358, Feature3: 4.112} to perform diagnosis via the rule engine according to the diagnostic model A, so as to output a diagnosis result that can determine the status of the wind power main bearing.

Therefore, according to the diagnostic system of the embodiment of the present disclosure, for a plurality of predetermined devices, a plurality of taxonomic definitions are stored in the classification gateway of the system, and a plurality of diagnostic libraries corresponding to each taxonomic definition are stored in the database of the system, wherein each taxonomic information includes taxonomic definition data for identifying the predetermined devices and diagnostic data corresponding to the taxonomic definition data. In this way, when one target device among the plurality of predetermined devices is diagnosed, the diagnostic model customized for the target device in the diagnostic library corresponding to the first classification definition data can be obtained quickly and easily from the database through the classification gateway under the condition of only the first classification definition data of the target device is received, and the diagnosis can be performed automatically in combination with the monitoring data of the target device, so as to efficiently determine the status of the target device while performing the customized diagnosis.

Second Embodiment

Figure 6A:
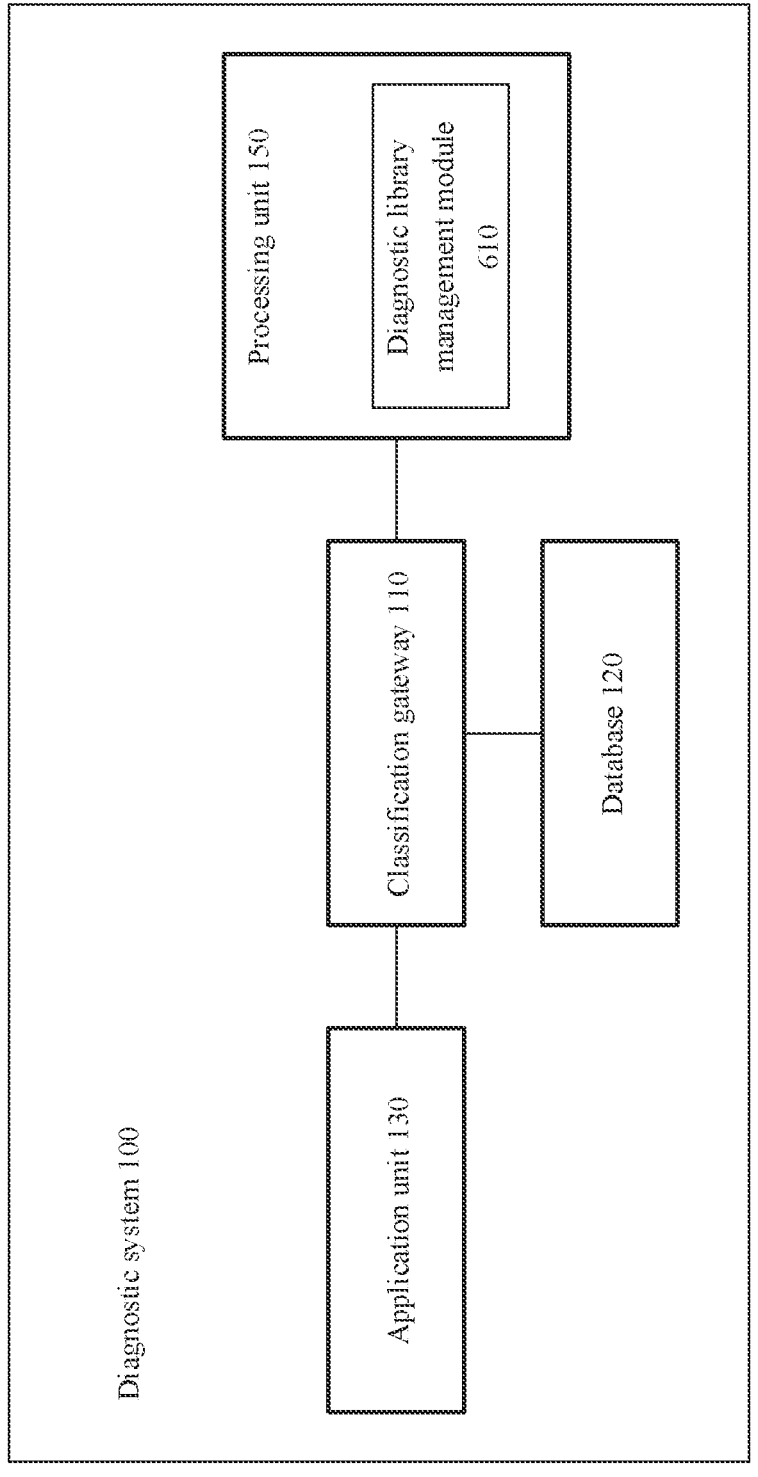
FIG. 6A shows a block diagram of a diagnostic system according to a second embodiment of the present disclosure.
Figure 6B:
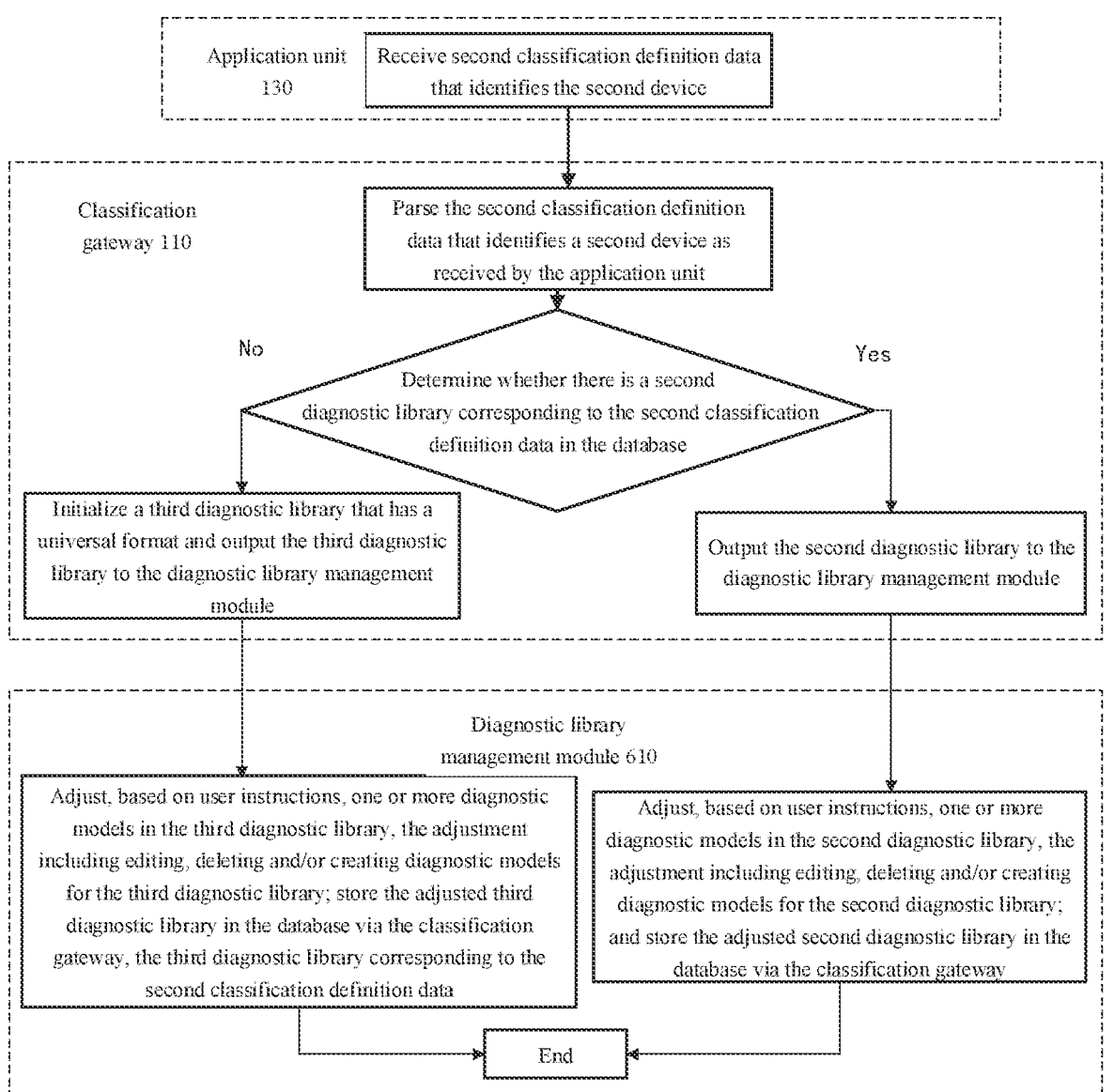
FIG. 6B shows a system flowchart of a diagnostic system according to the second embodiment of the present disclosure.

FIGS. 6A and 6B show a block diagram of a diagnostic system according to the second embodiment of the present disclosure and a system flowchart thereof, respectively. As shown in the figures, in order to reduce time consumed in managing and maintaining the diagnostic model and further improve efficiency of the diagnostic system, the application unit may be further configured to receive second classification definition data that identifies a second device, wherein the processing unit 150 may further include a diagnostic library management module 610, and the classification gateway 110 may be further configured to: parse the second classification definition data that identifies the second device received by the application unit, determine whether a second diagnostic library corresponding to the second classification definition data in the database 120, extract the second diagnostic library from the database 120 and output the second diagnostic library to the diagnostic library management module 510 in response to the existence of a second diagnostic library that corresponds to the second classification definition data in the database. The diagnostic library management module 510 may be configured to: adjust, based on user instructions, one or more diagnostic models in the second diagnostic library, wherein the adjustment includes editing, deleting and/or creating diagnostic models for the second diagnostic library; and store the adjusted second diagnostic library in the database 120 via the classification gateway 110.

In addition, the classification gateway 110 may be further configured to: initialize a third diagnostic library that has a universal format and output the third diagnostic library to the diagnostic library management module 610 in response to the absence of a second diagnostic library that corresponds to the second classification definition data in the database 120. The diagnostic library management module 610 is configured to: adjust, based on user instructions, one or more diagnostic models in the third diagnostic library, wherein the adjustment includes editing, deleting and/or creating diagnostic models for the third diagnostic library; store the adjusted third diagnostic library in the database 120 via the classification gateway 110, wherein the third diagnostic library corresponds to the second classification definition data.

In one example, editing, deleting and/or creating of the model in the diagnostic library may be implemented through a rule borderliner.

Therefore, the diagnostic system according to the second embodiment of the present disclosure can reduce the time consumed in managing and maintaining the diagnostic model on the basis of ensuring customization, so as to further improve efficiency of the diagnostic system.

Third Embodiment

In addition to the above-described taxonomy-based diagnostic system for determining a status of a target device, the present disclosure further provides a taxonomy-based diagnostic method for determining a status of a target device, which will be described in detail next with reference to FIG. 7.

FIG. 7 shows a flowchart of a diagnostic method according to the third embodiment of the present disclosure. As shown in FIG. 7, the diagnostic method described in the present disclosure may include the following steps:

S710: receiving first classification definition data that identifies the target device;

S720: acquiring monitoring data of the target device; and

S730: extracting, from a database, a first diagnostic library that corresponds to the first classification definition data via a classification gateway, wherein the classification gateway stores a plurality of taxonomic information, each taxonomic information includes classification definition data for identifying a predetermined device and diagnostic data corresponding to the classification definition data, the diagnostic data includes one or more diagnoses made on the predetermined device, features that need to be extracted for diagnoses, and monitoring data required to extract each feature, and the database stores a plurality of diagnostic libraries, each diagnostic library corresponds to one type of taxonomic information and includes a set of diagnostic models for determining a status of a device based on features of the device; and S740: determining the status of the target device according to the monitoring data of the target device and diagnostic models in first diagnostic library.

According to the diagnostic method of the third embodiment of the present disclosure, for a plurality of predetermined devices, the classification gateway and the database can be set, a plurality of taxonomic definitions are stored in the classification gateway, and a plurality of diagnostic libraries corresponding to each taxonomic definition are stored in the database, wherein each taxonomic information includes taxonomic definition data for identifying the predetermined devices and diagnostic data corresponding to the taxonomic definition data. In this way, when one target device among the plurality of predetermined devices is diagnosed, the diagnostic model customized for the target device in the diagnostic library corresponding to the first classification definition data can be obtained quickly and easily from the database through the classification gateway under the condition of only the first classification definition data of the target device is received, and the diagnosis can be performed automatically in combination with the monitoring data of the target device, so as to efficiently determine the status of the target device while performing the customized diagnosis.

For some specific details of the diagnostic method shown in FIG. 7, reference can be made to the contents of the above-described diagnostic system.

In addition, the system described herein may include a processor and a memory. The processor and the memory both can be connected by a bus. The system may be any type of portable devices (such as smart phones, tablet computers, etc.) or any type of fixed devices (such as desktop computers, servers, etc.).

The processor can perform various actions and processes according to the programs stored in the memory. Specifically, the processor may be an integrated circuit chip with the signal processing capability. The processor described above may be a general-purpose processor, a digital signal processor (DSP), an application specific integrated circuit (ASIC), a Field Programmable Gate Array (FPGA) or other programmable logic devices, discrete gates or transistor logic devices, and discrete hardware components. The respective methods, steps and logic diagrams disclosed in the embodiments of the present disclosure can be implemented or executed. The general-purpose processor may be a microprocessor or the processor may also be any conventional processor, etc., which may be of X86 architecture or ARM architecture.

The memory stores computer-executable instructions, which, when executed by a processor, implement the diagnostic system in each of the above embodiments. The memory may be a volatile memory or a non-volatile memory, or may include both a volatile memory and a non-volatile memory. The non-volatile memory may be a read only memory (ROM), a programmable read only memory (PROM), an erasable programmable read only memory (EPROM), an electrically erasable programmable read only memory (EEPROM) or a flash memory. The volatile memory may be a random access memory (RAM), which is used as an external cache. By way of illustration but not limitation, many forms of RAM are available, such as static random access memory (SRAM), dynamic random access memory (DRAM), synchronous dynamic random access memory (SDRAM), double data rate synchronous dynamic random access memory (DDRSDRAM), enhanced synchronous dynamic random access memory (ESDRAM), synchronous connection dynamic random access memory (SLDRAM) and direct memory bus random access memory (DR RAM). It should be noted that the memories of the method described herein are intended to include, but not limited to, these and any other suitable types of memories.

In addition, the diagnostic system or method according to the present disclosure may be recorded in a computer-readable storage medium. Specifically, according to the present disclosure, it is possible to provide a computer-readable storage medium storing computer-executable instructions, which, when executed by a processor, can cause the processor to implement the diagnostic system or method as described above.

It should be noted that, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, the module, the segment, or the portion of code includes at least one executable instruction for implementing the specified logical function. It should also be noted that, in some alternative implementations, the functions noted in the block may occur out of the order noted in the figures. For example, two blocks shown in succession may, in fact, be executed substantially concurrently, or they may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Generally, various example embodiments of the present disclosure can be implemented in hardware or dedicated circuits, software, firmware, logic, or any combinations thereof. Some aspects can be implemented in hardware, while other aspects can be implemented in firmware or software that can be executed by a controller, a microprocessor or other computing devices. While aspects of the embodiments of the present disclosure are illustrated or described as block diagrams, flow charts, or some other image representations, it will be understood that the blocks, devices, systems, techniques, or methods described herein can be implemented in hardware, software, firmware, special-purpose circuits or logic, general-purpose hardware or controllers or other computing devices, or some combinations thereof, as non-limiting examples.

Unless otherwise defined, all terms (including technical and scientific terms) used herein have the same meaning as commonly understood by those of ordinary skill in the art to which this disclosure belongs. It will be further understood that terms, such as those defined in commonly used dictionaries, should be interpreted as having the meaning that is consistent with their meaning in the context of the relevant art and will not be interpreted in an idealized or overly formal sense unless expressly so defined herein.

The above is illustration of the present disclosure and should not be construed as making limitation thereto. Although some exemplary embodiments of the present disclosure have been described, those skilled in the art can easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the embodiments of the present disclosure and other embodiments are intended to be included in the scope of the attached claims. The present disclosure is defined by the claims and their equivalents.

What is claimed is:

1. A taxonomy-based diagnostic system for determining a status of a target device, comprising:

a classification gateway configured to store a plurality of taxonomic information, each taxonomic information including classification definition data for identifying a predetermined device and diagnostic data corresponding to the classification definition data, wherein the diagnostic data includes one or more diagnoses made on the predetermined device, features that need to be extracted for diagnosis, and monitoring data required to extract each feature;

a database configured to store a plurality of diagnostic libraries, each diagnostic library corresponding to one type of taxonomic information and including a set of diagnostic models for determining a status of a device based on features of the device;

an application unit configured to receive first classification definition data that identifies the target device;

a data acquisition unit comprising a sensor, a collector, and a data transmission module, the sensor being configured to acquire monitoring data of the target device, the collector being configured to receive the monitoring data from the sensor and the data transmission module being configured to transmit the monitoring data to a processing unit; and the processing unit configured to determine the status of the target device according to the monitoring data of the target device and diagnostic models in diagnostic libraries corresponding to the first classification definition data acquired from the database through the classification gateway.

2. The diagnostic system according to claim 1, wherein the classification gateway is further configured to:

parse the first classification definition data received by the application unit, and determine, from the stored plurality of taxonomic information, first taxonomic information that corresponds to the first classification definition data;

determine, from the first taxonomic information, a list of features that need to be extracted and titles of monitoring data required to extract each feature, and output them to the processing unit; and extract, from the database, a first diagnostic library that corresponds to the first taxonomic information, and output the first diagnostic library to the processing unit.

3. The diagnostic system according to claim 2, wherein the processing unit further comprises:

a feature extraction module configured to read the monitoring data of the target device acquired by the data acquisition unit, and extract, from the monitoring data, feature values of one or more features according to the list of features that need to be extracted and the titles of the monitoring data required to extract each feature as received from the classification gateway;

a matching module configured to determine whether the extracted one or more features match a list of features required for diagnosis of one or more diagnostic models in the first diagnostic library, and activate a set of corresponding diagnostic models in response to that the extracted one or more features match a list of features required for diagnosis, wherein the diagnostic models are based on predetermined diagnostic rules and have a predetermined list of features required for diagnosis;

the processing using further comprising a diagnosis module operating thereon configured to perform diagnosis, for the activated set of diagnostic models, according to predetermined diagnosis rules in the diagnostic models by using the extracted feature values of one or more features, to output a diagnosis result indicative of the status of the target device.

4. The diagnostic system according to claim 3, wherein the feature extraction module is further configured to:

determine whether the monitoring data of the target device conforms to the monitoring data required to extract each feature as indicated in the diagnostic data in the first taxonomic information;

extract feature values of the one or more features from the monitoring data of the target device in response to that the monitoring data of the target device conforms to the monitoring data required to extract the one or more features; and skip extraction of a specific feature in response to that the monitoring data of the target device does not conform to the monitoring data required to extract the specific feature.

5. The diagnostic system according to claim 1, wherein the application unit is further configured to receive second classification definition data that identifies the second device, wherein the processing unit further includes a diagnostic library management module, the classification gateway is further configured to:

parse the second classification definition data that identifies a second device as received by the application unit;

determine whether there is a second diagnostic library corresponding to the second classification definition data in the database;

extract the second diagnostic library from the database and output the second diagnostic library to the diagnostic library management module in response to the existence of a second diagnostic library that corresponds to the second classification definition data in the database, the diagnostic library management module is configured to:

adjust, based on user instructions, one or more diagnostic models in the second diagnostic library, the adjustment including editing, deleting and/or creating diagnostic models for the second diagnostic library; and store the adjusted second diagnostic library in the database via the classification gateway.

6. The diagnostic system according to claim 5, wherein the classification gateway is further configured to:

initialize a third diagnostic library that has a universal format and output the third diagnostic library to the diagnostic library management module in response to the absence of a second diagnostic library that corresponds to the second classification definition data in the database;

the diagnostic library management module is configured to:

adjust, based on user instructions, one or more diagnostic models in the third diagnostic library, the adjustment including editing, deleting and/or creating diagnostic models for the third diagnostic library;

store the adjusted third diagnostic library in the database via the classification gateway, the third diagnostic library corresponding to the second classification definition data.

7. The diagnostic system according to claim 1, wherein the classification definition data includes a plurality of definition parameters related to a predetermined device, each of the definition parameters indicates a different characteristic of the predetermined device respectively.

8. The diagnostic system according to claim 7, wherein the definition parameters include one or more of an asset title, an asset sequence, an asset category, an asset type, and a segment.

9. A taxonomy-based diagnostic method for determining a status of a target device, comprising:

receiving first classification definition data that identifies the target device;

acquiring monitoring data of the target device; and extracting, from a database, a first diagnostic library that corresponds to the first classification definition data via a classification gateway, wherein the classification gateway stores a plurality of taxonomic information, each taxonomic information includes classification definition data for identifying a predetermined device and diagnostic data corresponding to the classification definition data, the diagnostic data includes one or more diagnoses made on the predetermined device, features that need to be extracted for diagnosis, and monitoring data required to extract each feature, the database stores a plurality of diagnostic libraries, each diagnostic library corresponds to one type of taxonomic information and includes a set of diagnostic models for determining a status of a device based on features of the device; and determining the status of the target device according to the monitoring data of the target device and diagnostic models in first diagnostic library.

10. A non-transitory computer-readable storage medium that stores computer-readable instructions, wherein a taxonomy-based diagnostic system for determining a status of a target device according to claim 1 is implemented when the computer-readable instructions are executed by a processor.

\*　\*　\*　\*　\*